United States Patent [19]

Russell

[11] 4,050,811
[45] Sept. 27, 1977

[54] OPTICAL DATA RECORD COPIER HAVING ARRAY OF LENSES WITH FIELD GAPS ALIGNED WITH DATA GAPS

[75] Inventor: James T. Russell, Richland, Wash.

[73] Assignee: Eli S. Jacobs, New York, N.Y.

[21] Appl. No.: 679,005

[22] Filed: Apr. 21, 1976

[51] Int. Cl.² .............. G03B 27/44; G03B 27/50; G03B 33/10; G01D 9/42
[52] U.S. Cl. ................ 355/46; 346/107 R; 354/102; 355/50
[58] Field of Search .............. 350/162 SF, 167; 354/101, 102, 110, 112, 125; 346/76, 107 R; 355/18, 20, 27, 31, 50, 51, 54, 64, 65, 66, 46

[56] References Cited

U.S. PATENT DOCUMENTS

| 2,095,826 | 10/1937 | Miller | 354/102 X |
|---|---|---|---|
| 2,458,877 | 1/1949 | Rose | 346/107 R X |
| 3,264,933 | 8/1966 | Frank | 355/50 |
| 3,422,219 | 1/1969 | Teeple | 346/107 R X |
| 3,592,542 | 7/1971 | Kaufer et al. | 355/50 |
| 3,605,593 | 9/1971 | Anderson | 355/46 X |
| 3,694,076 | 9/1972 | Weber | 355/50 |
| 3,704,068 | 11/1972 | Waly | 350/167 |
| 3,712,202 | 1/1973 | Lang | 355/54 X |
| 3,820,893 | 6/1974 | Donohue et al. | 355/50 X |
| 3,907,420 | 9/1975 | Yevich | 353/27 X |

FOREIGN PATENT DOCUMENTS

| 573,643 | 3/1924 | France | 355/50 |
|---|---|---|---|
| 1,024,961 | 4/1966 | United Kingdom | 355/54 |

*Primary Examiner*—Donald A. Griffin
*Attorney, Agent, or Firm*—Klarquist, Sparkman, Campbell, Leigh, Hall & Whinston

[57] ABSTRACT

An optical data record copying apparatus is described which includes an array of lenses whose viewing fields do not overlap but are separated by field gaps. The viewing field gaps are aligned with data gaps between data groups in the data tracks on the master record to prevent distortion of the copied data. The optical data is high density digital or analog data, such as digital color television signals recorded on an optical video disc. The lens array may include a plurality of lens pairs which are separated by a light opaque mask having apertures each aligned with different lens pairs for limiting the viewing field of each lens pair. One embodiment of the copying apparatus of the present invention employs a fixed lens array and moves the master record and copy so that such lens array scans the entire length of the master. Another embodiment employs a moving lens array and a fixed master record and copy, such lens array and associated light source being scanned along the length of the master during copying.

14 Claims, 7 Drawing Figures

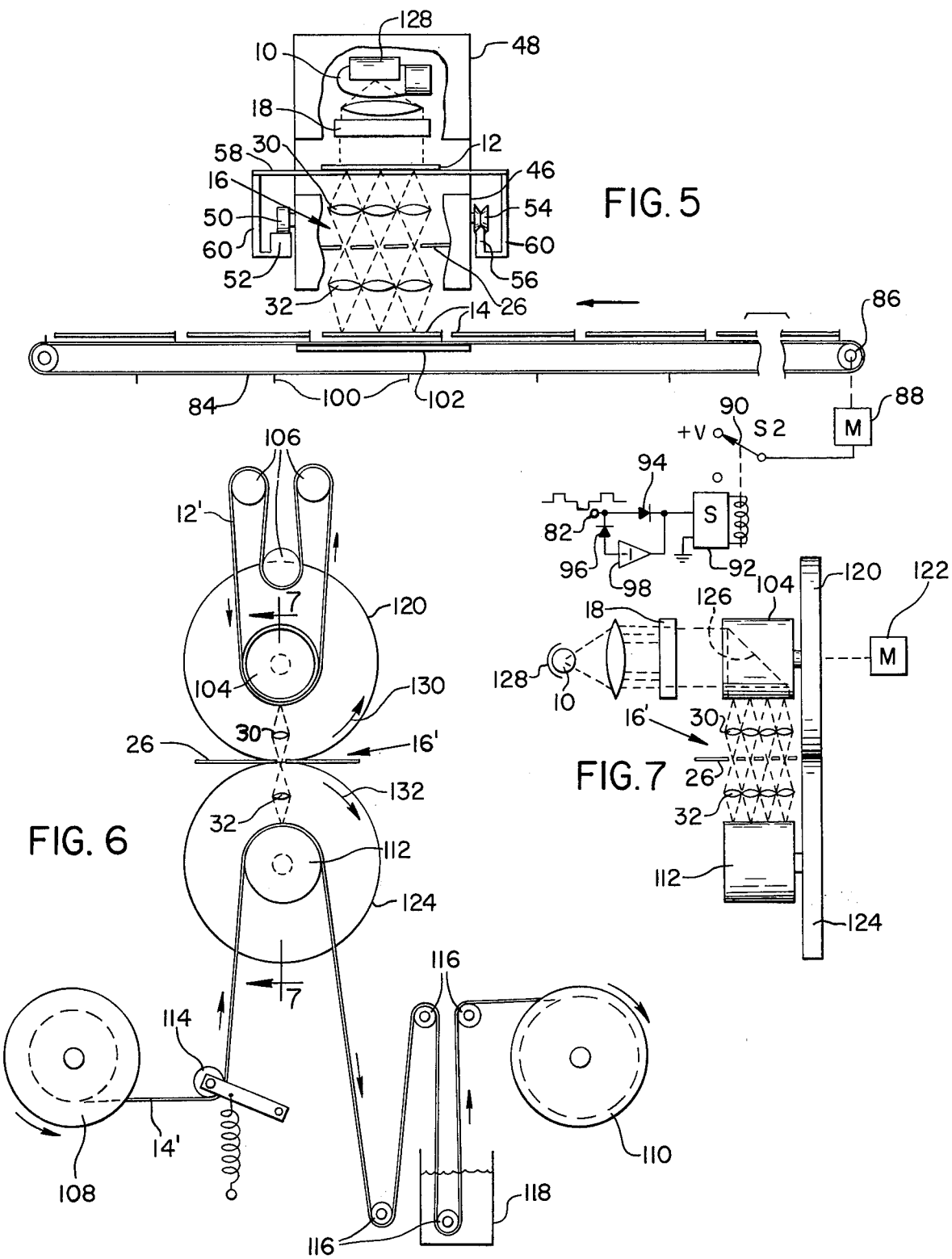

OPTICAL DATA RECORD COPIER HAVING ARRAY OF LENSES WITH FIELD GAPS ALIGNED WITH DATA GAPS

BACKGROUND OF THE INVENTION

The subject matter of the present invention relates generally to optical copying apparatus for making multiple copies of an optical data record of digital or analog data, and in particular to such a copying apparatus employing a multiple lens array which is scanned across the master record during copying.

The present optical copying apparatus is especially useful for copying a video disc having digital color television signals recorded thereon. Such copying apparatus has the advantage that, unlike contacting record copiers, it does not wear out the master record having original data recorded thereon, and may employ relatively low cost lenses while making copies of high density data records with great accuracy and low distortion. This low image distortion is made possible by supporting the array of lenses and limiting the viewing fields of such lenses so that such fields do not overlap but are spaced apart by field gaps. These field gaps are aligned with data gaps between data groups on the record, so that different data groups are transmitted through each lens of the array. A mask is employed with apertures in alignment with the lenses and may be supported in position between the lenses of each of a plurality of lens pairs forming the array, in order to limit the fields of view of such lens pairs to the central portions of the lenses which is substantially linear and has no magnification distortion.

It has been previously proposed to make optical digital data records by a recording means using a light beam focused on photographic film, as shown in U.S. Pat. No. 3,465,352 of C. O. Carlson, granted Sept. 2, 1969, and U.S. Pat. No. 3,422,219 of L. R. Teeple, granted Jan. 14, 1969. However, previously there has been no satisfactory copying apparatus for making multiple copies of optical records of high density digital or analog data, such as for example would be required for producing consumer television records or high fidelity audio music records. Conventional photographic enlargers were previously employed for copying optical data records and employ a single imaging lens having a wide viewing field. Ordinarily enlarger lenses do not have the high image resolution and field linearity required for copying high density optical data. Thus, digital optical records may have binary information bits on the order of approximately one micron in diameter and the data is stored at extremely high densities on the order of about $10^{+8}$ bits/inch$^2$. As a result of this extremely high bit density and small bit size, any appreciable lens distortion would prevent accurate copies of the master record from being made.

It is economically unfeasible to use single lens type optical copiers for copying optical records of high density data, due to the high cost of making a suitable lens of high enough quality. In order to overcome this problem, the optical copying apparatus of the present invention employs an array of a plurality of relatively small, inexpensive lenses supported adjacent a mask whose apertures are aligned with such lenses so that only the high resolution, linear central portions of such lenses are employed for image transmission. This mask stops light from being transmitted through the outer portions of the lens adjacent the periphery thereof which are of low linearity and poor image resolution, thereby preventing distortion of the optical image transmitted through such lens. As a result, the useful viewing fields of the lenses do not overlap but are spaced apart by field gaps. The field gaps are aligned with data gaps between adjacent data groups on such record so that such field gaps do not prevent any of the optical data on the master record from being copied as the lens array is scanned across such master record.

Previously it has been proposed to provide an optical copying apparatus for copying analog images, such as document pages, by employing an array of lenses which is either fixed or is scanned across such document, as shown in U.S. Pat. No. 3,584,950 of R. Gundloch, granted June 15, 1971, U.S. Pat. No. 3,592,542 of H. Kaufer et al, granted July 13, 1971, and U.S. Pat. No. 3,605,593 of R. H. Anderson, granted Sept. 20, 1971. However, in all of these office copier types of optical copying apparatus, the viewing fields of the lenses overlap and are free of any gaps between viewing fields in order to provide a continuous image of the document or other object being copied. As a result, such optical copiers are not suitable for copying optical records of high density data because of the distortion caused by the overlapping viewing fields. This distortion would prevent accurate copies of the data record from being made with such prior copying apparatus. For example, the lens distortion in lenses typically used for office copiers is about 1%. This 1% distortion is unnoticeable in copies of the documents. However, it is totally unacceptable when making copies of high density optical data records, such as video records of digital television line signals. A digital television line signal would typically have about 1000 bits per line so that when its image is transmitted through one of the lenses, the 1% error would then amount to 10 bits per line, which is too great for commercial acceptance.

This problem is avoided in the copying apparatus of the present invention by employing field gaps between the viewing fields of the lenses and aligning such gaps with corresponding data gaps between adjacent data groups on the master record. For example, such data gaps may be approximately 250 microns wide and may correspond to the horizontal blanking periods between television line signals which are recorded in a plurality of data tracks on such record so that the data gaps of adjacent tracks are laterally aligned to enable the lens array to scan laterally across such data tracks while the field gaps remain aligned with such data gaps.

SUMMARY OF THE INVENTION

It is therefore one object of the present invention to provide an optical data record copying apparatus of high image resolution and low image distortion which is capable of accurately copying high density optical data.

Another object of the invention is to provide such a copying apparatus which is relatively inexpensive and can make a large number of copies with no wear on the master record.

An additional object of the invention is to provide such a copying apparatus which includes an array of lenses whose viewing fields do not overlap but are separated by field gaps which are aligned with data gaps between adjacent data groups on the master record to provide high quality copies which reproduce all of the data on such master record.

Still another object of the present invention is to provide such a copying apparatus in which the viewing fields of the lenses in such array are limited by a mask whose apertures are aligned with such lenses so that the effective viewing field of the lenses is limited to the central portion thereof to reduce distortion.

A still further object of the invention is to provide such a copying apparatus in which the lens array and the master record as well as the copy are moved relative to one another during copying to scan the fields of view of the lenses across such master record to produce copies quickly and inexpensively.

BRIEF DESCRIPTION OF DRAWINGS

Other objects and advantages of the present invention will be apparent from the following detailed description of certain preferred embodiments thereof and from the attached drawings of which:

FIG. 5 is a vertical section view taken along the line 5—5 of FIG. 4;

FIG. 6 is a side elevation view of a fourth embodiment of the copying apparatus of the present invention employing a fixed lens array and a moving master record and copy; and FIG. 7 is a vertical section view taken along the line 7—7 of FIG. 6.

DESCRIPTION OF PREFERRED EMBODIMENT

Figure 1:
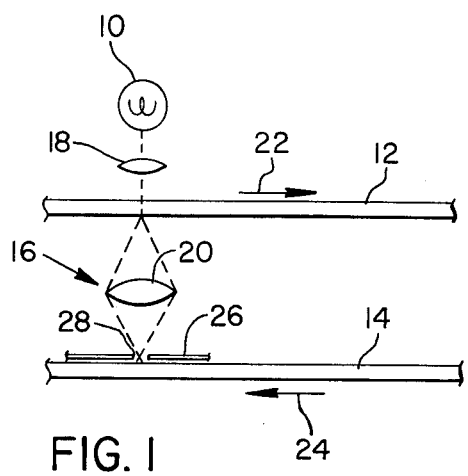
FIG. 1 is a side elevation view of one embodiment of the copying apparatus of the present invention.

As shown in FIG. 1, one embodiment of the optical data record copying apparatus of the present invention includes a fixed light source 10 which may be a fluorescent light or incandescent light of high intensity, a moving optical master record 12 having analog or digital optical data recorded thereon, a moving photosensitive copy material 14, and a fixed multiple lens array 16 positioned between such master record and copy. The master record 12 is preferably a light transparent optical data record through which light is transmitted from light source 10 for modulation by optical data on such record. However, it is also possible to employ a light reflective optical data record in which case the copy 14 and lens array 16 would be positioned on the same side of the master record as light source 10. Light emitted from a fixed source 10 is focused onto the master record 12 by a cylindrical lens 18 resulting in an elongated light beam which illuminates a strip across the width of the moving master record in alignment with the plurality of lenses 20, such as microscope objective lenses, forming the fixed lens array 16. Lenses 20 are spaced apart to provide field gaps between their viewing fields which are aligned with data gaps between data groups on master record 12, as hereafter discussed in relationship to FIG. 3. The modulated light image of the optical data on master record 12 is transmitted through the lenses 20 of the lens array which focuses such light images onto the moving copy 14.

The master record 12 moves to the right in the direction of arrows 22 while the copy material 14 moves to the left in the direction of arrows 24 so that a complete copy of the optical data on the master record is formed on the copy material 14. A light opaque mask 26 may be provided closely adjacent the surface of the copy 14, as shown in FIG. 1, so that a plurality of mask apertures 28, provided in such mask, are aligned with each of the lenses 20 and positioned in the focal plane of the lenses to limit the viewing field of such lenses to the central portion of the lens and thereby reduce image distortion. It is also possible to position the mask 26 in the object plane at the lower surface of the master record 12, rather than in the position shown in FIG. 1.

Figure 2:
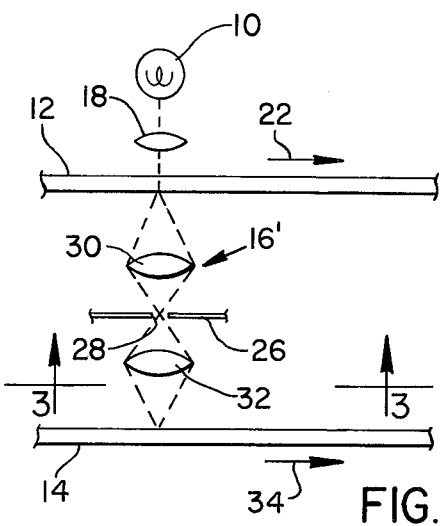
FIG. 2 is a side elevation view of a second embodiment of the copying apparatus of the present invention.
Figure 3:
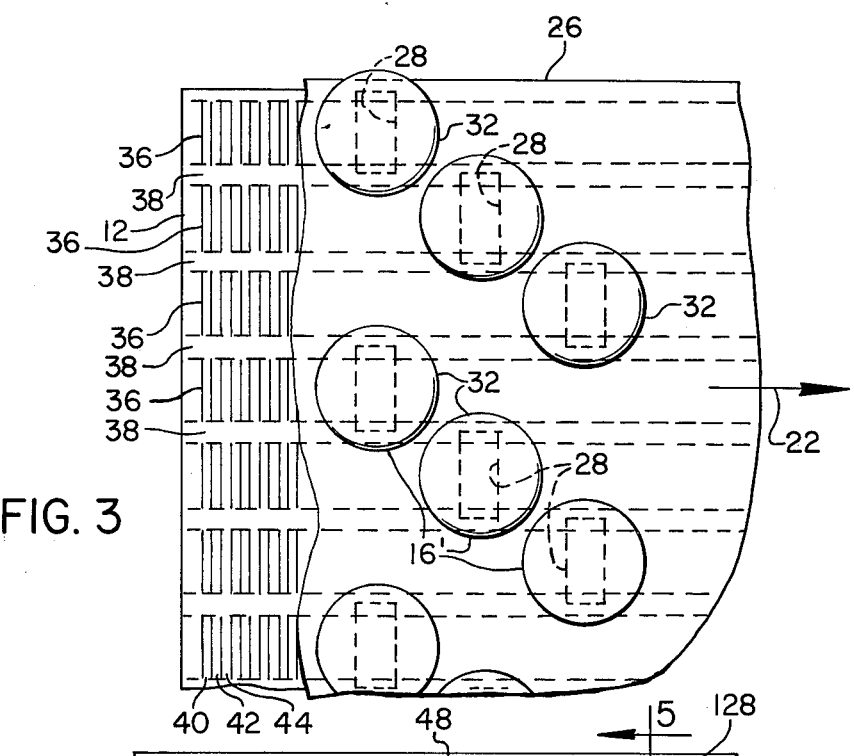
FIG. 3 is a horizontal section view taken along the line 3—3 of FIG. 2, with parts broken away for clarity.

As shown in FIGS. 2 and 3, a second embodiment of the optical data record copying apparatus of the present invention is similar to that of FIG. 1 except that the lens array 16' includes a plurality of pairs of lenses 30 and 32 of the same size and magnification in place of the single lenses 20. In this embodiment, the mask 26 is positioned between the lenses 30 and 32 with apertures 28 in alignment with the central portion of the lenses at the intermediate focal plane of the lenses so that such mask apertures define the field of view at the image plane where the copy 14 is located. Another difference is that the copy material 14 moves to the left in the direction of arrow 34 in the same direction as the master record 12. This second embodiment is suitable for copying analog optical data since lens 30 inverts the data image and lens 32 erects such image to provide a final image on copy 14 which is of the same orientation as the object data on master 12.

As shown in FIG. 3, the master record 12 has a plurality of groups 36 of optical data with adjacent data groups being spaced apart by data gaps 38. The fields of view of adjacent lens pairs 30, 32 do not overlap but are spaced apart by field gaps in alignment with such data gaps. Thus, the mask apertures 28 limit the fields of view of the lens pairs to the central portions of the lens defined by such apertures and prevent the data image from being transmitted through the outer portions of the lens adjacent the periphery thereof, thereby reducing image distortion. In the embodiment shown in FIG. 3, a plurality of digital data tracks 40, 42, and 44, etc., extend parallel vertically across the record. Each data track is composed of a plurality of spaced data groups 36 which may each be a digital horizontal television line signal and the data gaps 38 between such data groups correspond to the horizontal blanking period of the television signal.

In the embodiment shown in FIG. 3, the data gaps 38 of adjacent data tracks 40, 42, and 44 are aligned horizontally so that during longitudinal scanning movement of the master record in the direction of arrow 22 for copying, the lens pairs remain aligned with the data groups and the viewing field gaps remain aligned with the data gaps 38 in all of the data tracks 40, 42, 44, etc. It should be noted that the mask apertures 28, which limit the viewing fields and extend partially into the two data gaps 38 on opposite sides of each aperture so that the length of the aperture covers one complete data group 36, which, in the example given, corresponds to a single digital horizontal television line signal. This horizontal television line signal typically contains about 1000 binary data bits of approximately 1 micron diameter, which may be in the form of light opaque spots and transparent spaces between such spots. Approximately 1000 horizontal television lines can be imaged by each lens pair 30, 32 at a given time. In the example given, the data gaps 38 are approximately 250 microns in width. It should be noted that the lens pairs are staggered for clearance between lenses and to provide the lens array which extends across the entire width of the master record. The lens pairs are supported in spaced relationship and the mask apertures are spaced from one another to prevent overlapping of the viewing fields and provide narrow field gaps which are aligned with the data gaps to enable high density data storage. The lenses 30, 32 may be individually adjustable relative to each other, as well as to the object plane occupied by the master record and the image plane occupied by the copy material 14 so that the lens pairs are set to focus different portions of the master record onto the copy sheet with the same magnification.

It should be noted that other data formats can be employed. For example, the data gaps 38 can be between groups of data tracks and the lens pairs can be distributed horizontally across the length of the record in FIG. 3, which is then scanned vertically along the tracks rather than in the horizontal direction laterally across such tracks.

Figure 4:
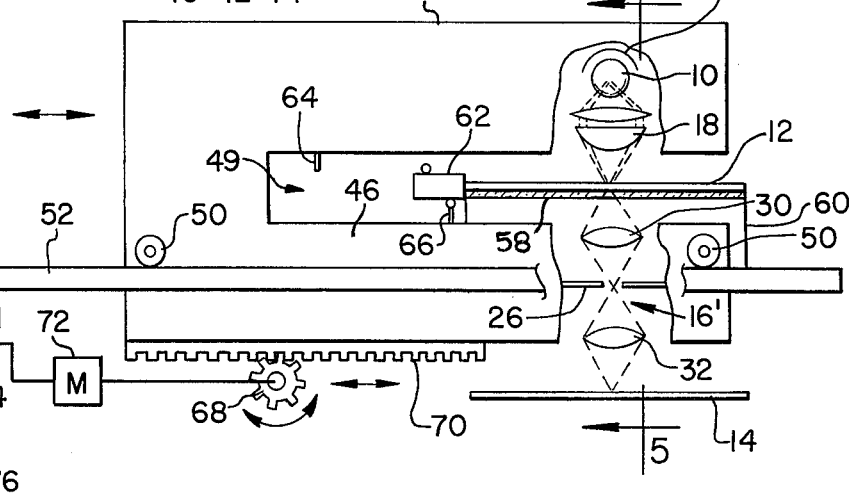
FIG. 4 is a side elevation view of a third embodiment of the copying apparatus of the present invention employing a fixed master record and a moving lens array, with parts broken away for clarity.

As shown in FIGS. 4 and 5 a third embodiment of the present invention, employing a fixed master record 12 and a moving lens array 16', is similar to that of FIGS. 2 and 3, so that only the differences between these two embodiments will be discussed. The lens pairs 30, 32 and intervening mask 26 are supported for reciprocating movement on a lower carriage arm 46 beneath the record 12 while the light source 10 and cylindrical lens 18 are supported on an upper carriage arm 48 above the master record 12. The two carriage arms are spaced apart by a space 49 to allow them to move back and forth across the surface of the record 12 to scan such record during copying and to make copies of the master record in both directions of scan. The two carriage arms are attached together at one end thereof and are mounted by a pair of rollers 50 on a support platform 52 to roll along such platform during scanning. A pair of guide rollers 54 are provided on one side of the carriage opposite from support rollers 50, such guide rollers having an annular notch which engages a pointed guide rail 56 to maintain the lens array 16' in alignment with the master record 12 and copy 14 during copying.

The master record 12 is supported on a light transparent glass plate 58 attached at its opposite ends to a pair of vertical supports 60 positioned outside of the path of rollers 50 and 54 on platform 52. A limit switch 62 is also supported on the left side of glass plate 58 adjacent to one end of the master record 12 in position to engage switch actuator arms 64 and 66, respectively attached to the upper carriage member 48 and the lower carriage member 46 in the space 49 between such carriage members. The actuator members 64 and 66 are located at the limits of the path of the carriage to engage contacts on opposite sides of the limit switch 62 and stop the carriage when scanning from one end of the master record to the other.

The carriage is moved back and forth by a rotating pinion 68 engaging a rack 70 attached to the bottom of the lower carriage arm 46. Pinion 68 is rotated by an electrical motor 72 which is a D.C. step motor connected by a step switch 74 to either a positive voltage source or a negative voltage source, depending on the position of such switch, to cause such motor to move in a clockwise or counterclockwise direction a predetermined amount. The switch 74 is actuated by a time delay solenoid 76 having two inputs connected through diodes 78 and 80 of opposite polarity to an input terminal 82 which is connected to the output of limit switch 62. Thus, the limit switch 62 produces positive and negative pulses when it engages actuators 64 and 66, respectively, and such pulses energize the solenoid in an opposite manner to move the step switch 74 up or down depending on the polarity of such pulses. The solenoid 76 has a sufficient time delay to enable the copy 14 produced by the previous scan of the master record to be replaced by a new unexposed copy sheet by means of the intermittent feed conveyor 84, shown in FIG. 5.

The conveyor belt 84 of FIG. 5 is provided with a drive roller 86, at one end thereof, which is actuated by a D.C. step motor 88. The step motor is energized by electrically connecting it to a positive D.C. voltage source through a stepping switch 90 which is operated by a solenoid 92 having no time delay. The upper terminal of solenoid 92 is connected through a pair of oppositely poled diodes 94 and 96 to input terminal 82, connected to the output of the limit switch 62. An inverting amplifier 98 is connected in series with diode 96 to invert the negative pulses transmitted through such diode to produce corresponding positive pulses which, together with the positive pulses through diode 94, energize solenoid 92 to cause switch 90 to close every time the master record is scanned completely in either direction. It should be noted that the solenoid 92 maintains the switch 90 closed for a sufficient time to enable the step motor 80 to advance the next copy 14 into copying position beneath the master record. This time interval corresponds to the time delay provided by the time delay solenoid 76 so that motor 72 is not energized to cause scanning until after the next copy sheet 14 is moved into the copying position. The conveyor belt 84 may be provided with positive indexing tabs 100 which engage the rear ends of copy sheets 14 to push such copies into the proper position beneath the master record. Also, a spring biased support plate 102 may be provided beneath the conveyor belt to hold the copy in alignment with the image plane of the lens array during copying.

A fourth embodiment of the present invention is shown in FIGS. 6 and 7 and is similar to that of FIGS. 2 and 3, in that it employs a fixed lens array 16', fixed light source 10, and moving record 12', together with moving copy sheet 14'. Therefore, only the differences between these two embodiments will be described. As shown in FIG. 6, the master record is in the form of a continuous film strip 12' wound about a transparent upper drum 104 and support rollers 106. The copy sheet 14' is in the form of a roll of photographic film wound on a supply reel 108 and transmitted from such supply reel to a take up reel 110 over the surface of a lower drum 112 which serves as the image surface onto which the data image is projected through the lens array 16'. The copy film strip 14' extends around a spring biased tension roller 114 and a plurality of guide rollers 116. The copy film strip may also be transmitted through a film processing tank 118 for developing the photographic image thereon. The developed copy film strip is taken from the reel 110 and cut into copy records for use in a suitable optical playback apparatus.

As shown in FIG. 7, the upper drum 104 is mounted on the shaft of a friction drive wheel 120 which is rotated by an electric motor 122 at a constant speed. The lower drum 112 is also mounted on a shaft connected to a second friction drive wheel 124 whose outer surface engages the surface of the drive wheel 120 for rotation therewith in an opposite direction. As a result, the upper drum 104 and master record film strip 12' rotate in a counterclockwise direction indicated by arrow 130 while the lower drum and the copy film strip rotate in a clockwise direction, indicated by arrow 132, at the same speed.

The light source 10 and cylindrical lens 18 are supported outside of the upper drum 104 in position to project an elongated light beam onto a flat mirror 126 fixedly mounted within such upper drum. Mirror 126 reflects the light beam downward through the transparent side wall of the upper drum 124, master record 12, and the lens array 16', to project the light image of data recorded on the master record onto the copy film strip 14'. A cylindrical light reflector 128 may be positioned to the left of the light source 10 of FIG. 7, as well as above the light source 10 in the embodiment of FIG. 4 to concentrate more of the light onto the master record.

Both of the embodiments shown in FIGS. 4 and 5 and FIGS. 6 and 7 employ lens arrays 16' and masks 26 similar to that shown and described above with respect to FIGS. 2 and 3. In this regard, the mask apertures 28 limit the viewing fields of the lens pairs 30 and 32 so that adjacent fields do not overlap but are separated by field gaps which are aligned with data gaps between data groups on the master record to enable scanning along such record, as shown in FIG. 3.

For playback of the optical record copies produced by the copying apparatus of the present invention, each of the data groups 36 on the master 12 and copy 14, representing a single horizontal television line signal, is provided with a few synchronizing bits at the start of the data group for synchronizing the playback clock as well as a few gap identifying bits identifying the presence of a data gap 38 either at the beginning or end of such data group. These synchronizing bits and gap identifying bits are in addition to the normal horizontal television line data bits and are coded to distinguish both therefrom.

The master optical data records 12 can be made using the recording apparatus shown in pending U.S. patent application Ser. No. 516,453, filed Oct. 21, 1974, now abandoned, and in continuation application Ser. No. 727,369, filed Sept. 27, 1976 by J. T. Russell or by any other suitable light beam recording apparatus including one employing a magnetically deflected optical fiber whose light output end is scanned across an array of lens pairs similar to that of array 16'. The input end of such optical fiber is supplied with a light beam that has been modulated in accordance with the digital or analog data being recorded.

It will be obvious to those having ordinary skill in the art that many changes may be made in the above-described details of the preferred embodiments of the present invention without departing from the spirit of the invention. For example, the fields of view defined by the mask apertures 28 in FIG. 3 need not be spaced apart but can touch so that there are no field gaps, so long as the boundaries between adjacent fields are aligned with the data gaps. Therefore, the scope of the present invention should only be determined by the following claims.

I claim:

1. Copying apparatus for making photocopies of optical data records, comprising:

first means for supporting a master record in a copying position, said master record having optical data tracks recorded thereon which include a plurality of spaced data groups separated by data gaps on said master record;

light means for directing light at said master record to produce light images of said data groups;

second means for supporting a photocopy record adjacent to said master record in said copying position;

a plurality of lenses supported between said master record and said photocopy record in an array of lenses extending across the master record, said lenses being positioned in spaced relationship so that the light images of different data groups are each transmitted through a different lens of said array to said photocopy record; and field separation means for limiting the viewing fields of said lenses simultaneously and for causing the fields of view of the array lenses when viewing the master record to be separate and spaced apart by field gaps at said master record which are aligned with said data gaps.

2. Copying apparatus in accordance with claim 1 in which the field separation means includes a light opaque mask having apertures therein which are aligned with the array lenses to limit the fields of view of said lenses so that said fields of view are spaced apart by field gaps aligned with said data gaps.

3. Copy apparatus in accordance with claim 2 which also includes motive means for causing relative movement between the master and the array of lenses during copying.

4. Copy apparatus in accordance with claim 3 in which the motive means moves the master record and the photocopy record while the lens array remains fixed.

5. Copy apparatus in accordance with claim 4 in which the motive means includes synchronizing means for synchronizing the movements of the master record and the photocopy record.

6. Copy apparatus in accordance with claim 5 in which the master record and photocopy record are photographic film strips mounted on two different rotating drums which are coupled together by said synchronizing means.

7. Copy apparatus in accordance with claim 3 in which the motive means moves the lens array while the master record and the photocopy record remain fixed.

8. Copy apparatus in accordance with claim 7 which also includes feed means for intermittently feeding the photocopy records into and out of said copying position.

9. Copy apparatus in accordance with claim 8 in which the motive means moves the lens array laterally across the photocopy record during recording substantially perpendicular to the intermittent feeding movement of said photocopy record.

10. Copy apparatus in accordance with claim 3 in which the data groups are each different digital horizontal television line signals and the data gaps are horizontal blanking periods between adjacent television line signals.

11. Copy apparatus in accordance with claim 10 in which the data gaps of adjacent data tracks are aligned to enable each lens of the array to scan laterally across all of the data tracks during copying.

12. Copy apparatus in accordance with claim 1 in which the master record has digital data groups recorded thereon.

13. Copy apparatus in accordance with claim 1 in which the lens array includes a second set of lenses aligned with the first mentioned lenses to provide a plurality of lens pairs through which the images of the data groups are transmitted.

14. Copy apparatus in accordance with claim 13 in which a light opaque mask is supported in the intermediate focal plane between the lenses of said lens pairs with apertures in said mask aligned with different lens pairs to limit their fields of view so that said fields of view are spaced apart by field gaps aligned with said data gaps.

* * * * *